United States Patent [19]

Garrett

[11] Patent Number: 5,322,255
[45] Date of Patent: Jun. 21, 1994

[54] MOUNTING BRACKET

[75] Inventor: Michael J. Garrett, Otterbourne, United Kingdom

[73] Assignee: International Business Machines Corporation, Armonk, N.Y.

[21] Appl. No.: 839,987

[22] Filed: Feb. 20, 1992

[30] Foreign Application Priority Data

Mar. 27, 1991 [GB] United Kingdom ............... 9106244

[51] Int. Cl.⁵ .............................................. A47F 5/00
[52] U.S. Cl. ...................................... 248/299; 248/918
[58] Field of Search ............... 248/918, 179, 183, 299, 248/221.4; 354/293; 352/243; 381/188

[56] References Cited

U.S. PATENT DOCUMENTS

| 2,495,065 | 1/1950 | Hull ................................ 248/299 X |
| 3,145,005 | 8/1964 | Wester ............................ 248/299 X |
| 4,653,709 | 3/1987 | Paldino .......................... 354/293 X |
| 4,763,151 | 8/1988 | Klinger .......................... 248/179 X |
| 4,811,405 | 3/1989 | Peiker ............................ 381/188 X |
| 4,813,642 | 3/1989 | Matsui .......................... 248/221.4 X |
| 5,012,348 | 4/1991 | Witzel et al. . |
| 5,016,851 | 5/1991 | Koskinen ....................... 248/183 X |
| 5,056,745 | 10/1991 | Gelbard ........................... 248/183 |
| 5,074,512 | 12/1991 | Gianforcaro .................. 248/918 X |

FOREIGN PATENT DOCUMENTS

| 877067 | 5/1953 | Fed. Rep. of Germany ...... 248/299 |
| 3608270 | 9/1987 | Fed. Rep. of Germany . |
| 8902287 | 6/1989 | Fed. Rep. of Germany . |
| 3820749 | 9/1989 | Fed. Rep. of Germany . |
| 0368827 | 5/1990 | Fed. Rep. of Germany . |
| 2213369 | 8/1989 | United Kingdom . |

Primary Examiner—J. Franklin Foss
Attorney, Agent, or Firm—David Aker

[57] ABSTRACT

A mounting bracket is provided for attaching an accessory onto a display device or the like that allows the accessory to be readily attached to or removed from said display device, comprising:
  a hooking portion shaped to cooperate with a front surface of said display device so as to locate said bracket;
  a mounting portion adapted to receive said accessory; and
  a stabilising portion providing a second point of location on said display device so as to provide stability between said bracket and said display device.

16 Claims, 4 Drawing Sheets

MOUNTING BRACKET

The present invention relates to a mounting bracket for attaching an accessory, for example a video camera or a microphone, to a display or similar device with which it is to be used. The mounting bracket is such that no adaptation to the display device is required, and permits fast attachment and removal of a variety of accessories.

The mounting device of the present invention is useful in many situations where display devices are employed. For example, in the modern office environment it is increasingly becoming desirable to attach various accessories to display devices. These accessories may vary from articles such as lamps or photos to articles such as video cameras or microphones which can be used interactively with the display device.

A variable angle supporting device for supporting an object such as a camera is described in UK Patent GB2,213,369. The object is mounted via a screw to a spherical ball which is movably mounted inside a ball holding member. The spherical ball is held in position by a pressing pad which presses against part of the external surface of the ball. Mesh means are provided between the lower part of the ball holding member and a base to clamp the ball holding member to the base. A release ring is provided to disengage the mesh means so that the ball holding member can be rotated with respect to the base. At the same time the release ring also retracts the pressing pad from the spherical ball so as to permit the ball to be moved relative to the ball holding member. Thus when the release ring is activated the object can be moved to a desired new orientation, and once in this position the release ring can be deactivated whereby the ball, ball holding member, and the base become locked together to provide a rigid support for the object.

Although the above Patent provides means for rotatably mounting an object, the variable angle supporting device described therein is complex and moreover does not provide a convenient means of mounting an accessory on a display or similar device.

It is an object of the present invention to provide a mounting bracket for attaching an accessory onto a display device or the like that allows the apparatus to be readily attached to or removed from such a display device.

Viewed from a first aspect the present invention provides a mounting bracket for attaching an accessory onto a display device or the like that allows the accessory to be readily attached to or removed from said display device, comprising:

a hooking portion shaped to cooperate with a front surface of said display device so as to locate said bracket;

a mounting portion adapted to receive said accessory; and a stabilising portion providing a second point of location on said display device so as to provide stability between said bracket and said display device.

The mounting portion can be adapted to receive the accessory in a variety of ways, either holding the accessory rigidly in one fixed position, or allowing the accessory some degree of movement. In preferred embodiments the mounting portion is attached to said accessory via connection means, said accessory being rigidly connected to said connection means, and said mounting portion being adapted so as to allow said connection means to be tilted or rotated within predetermined limits. This has the advantage of allowing for flexibility in the seating position of the display device's user by providing the ability for the accessory to be rotated or tilted so as to be in the position desired by the user.

The stabilising portion can either rest directly on the display device without any physical attachment to the display device, or can be attached by a variety of fastening devices. In preferred embodiments the stabilising portion includes a fastening device whereby said stabilising portion is physically attached to the display device. This provides for more securely mounting the bracket on the display.

Further in preferred embodiments the fastening device is a clip shaped such that no adaptation to the display device housing is required. As an example the clip can be made to clip between the ventilation grills provided in the rear of the display device. It is desirable for the mounting bracket to fit onto unmodified display devices since any modifications at the manufacturing stage would be costly and time consuming.

Viewed from a second aspect an accessory is provided with a mounting bracket in accordance with the present invention. Since the mounting bracket of the present invention is a cheap compact device it could easily be formed as part of the accessory rather than as a seperate component.

The present invention will be described further, by way of example only, with reference to an embodiment thereof as illustrated in the accompanying drawings, in which:

FIG. 1 shows a preferred embodiment of the present invention in which the mounting bracket is used to mount a camera on a computer monitor.

FIG. 2(a) and 2(b) show exploded perspective views of the mounting bracket and connection means in accordance with the preferred embodiment.

With the continuing advances that are being made in computer technology it is increasingly becoming advantageous to be able to optionally incorporate various accessories with a computer terminal. The following preferred embodiment of the present invention relates to a mounting bracket used to mount a video camera onto a computer monitor. This mounting bracket will be very useful in a variety of technical areas, for example "Personal Conferencing". Personal Conferencing is a computer application being developed to allow a number of people sitting at different terminals in different locations to see each other on their monitor screens. It also provides the ability for them to talk to each other, share spreadsheets, etc. This has many advantages such as providing means for holding effective meetings without people having to gather in one place.

In order for such systems to work effectively it is desirable to place the camera, microphone, etc. close to the monitor screen so that a person studying the screen will simultaneously be looking directly into the camera, or be able to talk directly into the microphone, without turning away from the screen.

Figure 1:
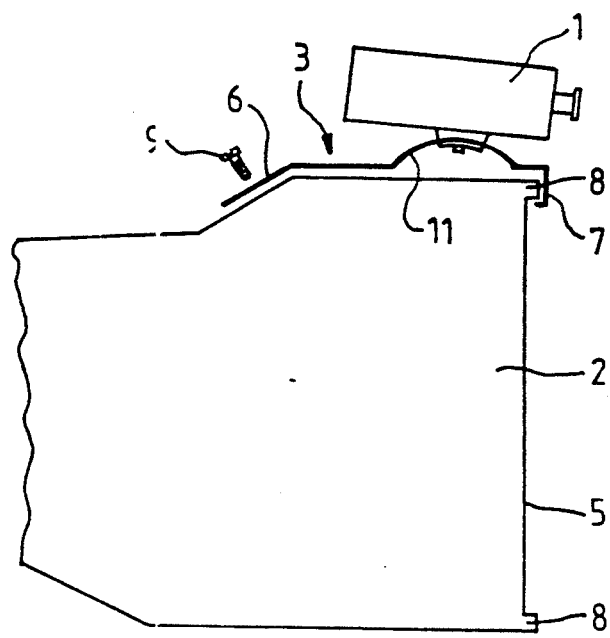

FIG. 1 shows a preferred embodiment of the present invention in which a mounting bracket 3 is used to mount a camera 1 on a computer monitor 2. The bracket 3 has a hooking portion 7 formed at one end which is shaped so as to hook around a rim 8 provided in the bezel of the computer monitor 2. A mounting portion 11 is provided in the bracket 3 to which the camera 1 can be mounted. The camera 1 is mounted in such a way that it can be tilted or rotated with respect to the monitor; this is discussed later in greater detail with respect to FIGS. 2(a) and 2(b). A stabilising portion 6 is provided at the opposite end of the bracket 3 to the hooking portion 7 which provides a second point of location for the bracket 3 so as to render the mounting of the bracket 3 on the monitor 2 more secure. As an option a fastening device such as a screw 9 or a clip 10 (see FIG. 2(b)) can be used to attach the stabilising portion 6 to the monitor 2, thereby further increasing the stability of the bracket 3.

Although in the preferred embodiment the hooking portion 7 locates around a rim 8 it will be appreciated that the hooking portion 7 can be shaped so as to hook onto any monitor wherein part of the monitor bezel overhangs the display screen 5.

Figure 2A:
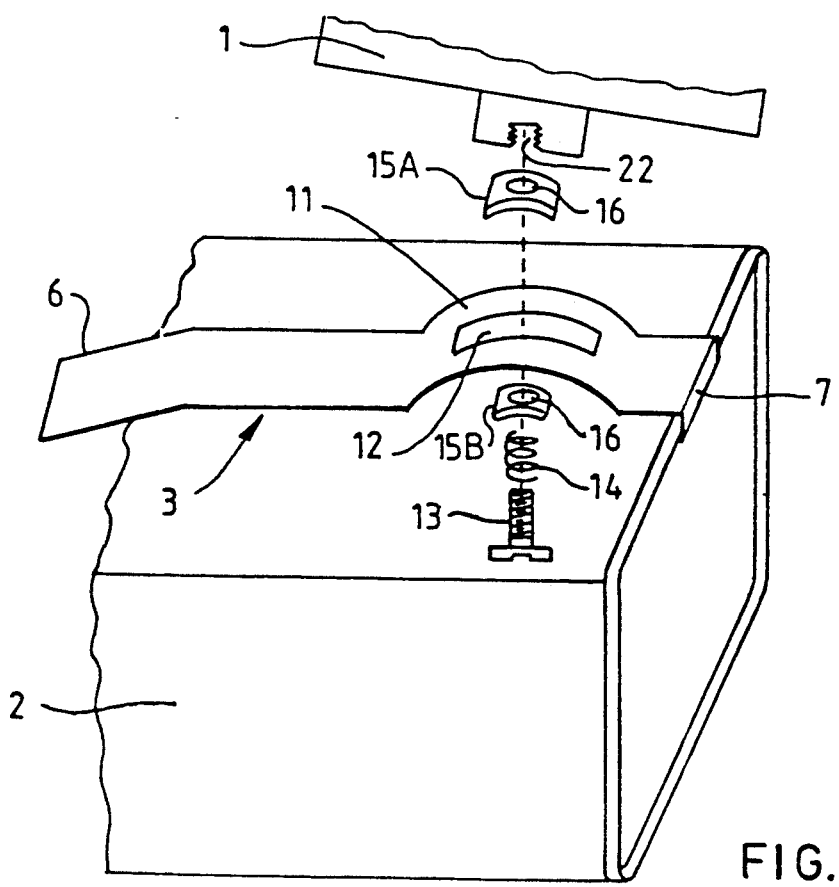
Figure 2B:
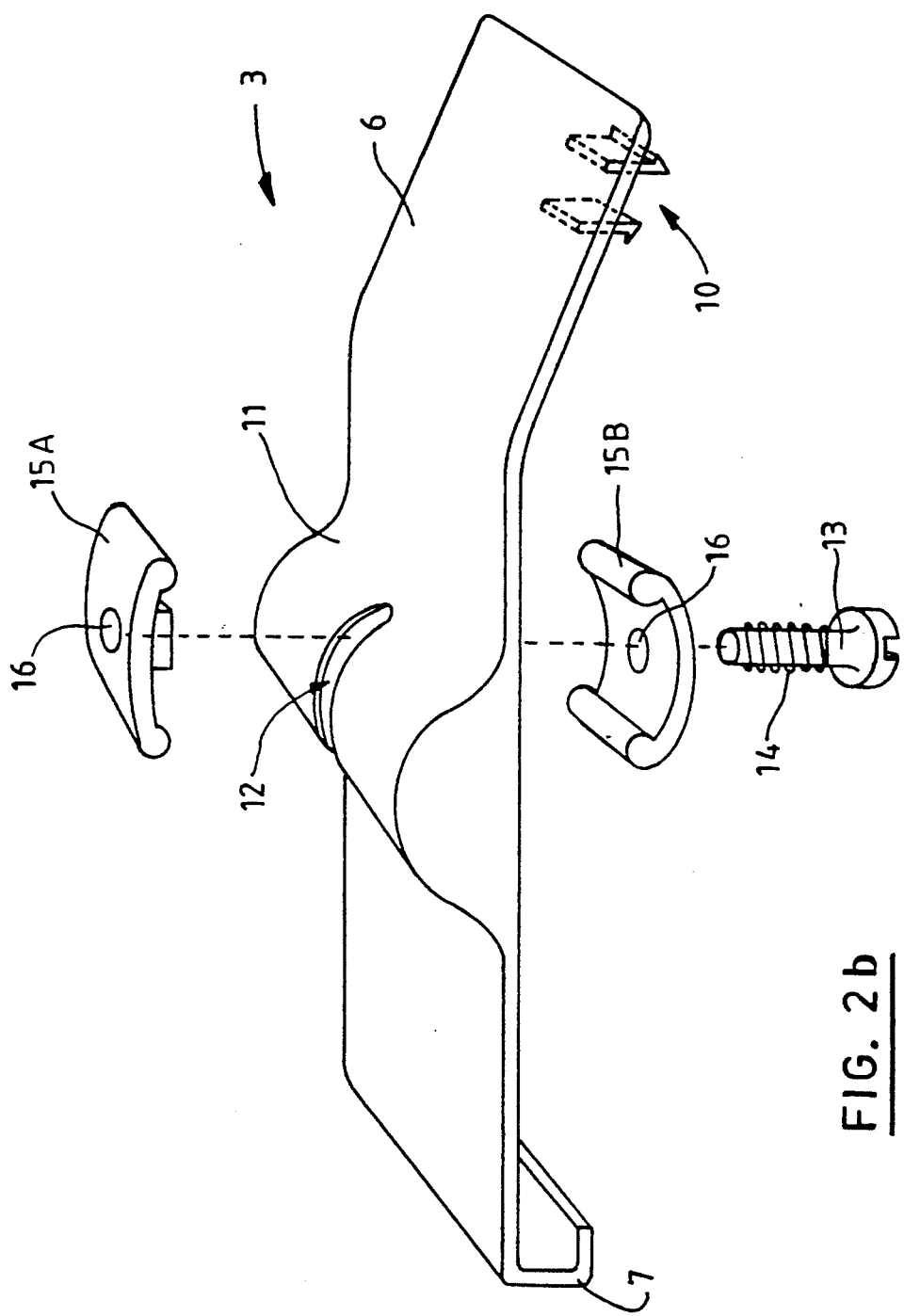

The mounting portion 11 of bracket 3 will now be discussed with respect to FIGS. 2(a) and 2(b). The mounting portion 11 of the preferred embodiment is formed in a curved shape with a slot 12 provided therein, the slot 12 extending in a direction parallel to the tangent to the curve. Upper and lower friction pads 15A,15B are provided to contact respectively against the convex and concave surfaces of mounting portion 11. Both pads 15A,15B are provided with through holes 16 to permit a screw 13 to pass freely through them. The screw 13 passes through a coil spring 14, hole 16 of lower pad 15B, slot 12, hole 16 of upper pad 15A and into a thread 22 provided in the base of the camera 1, the head of the screw 13 remaining on the concave side of mounting portion 11. The coil spring 14 provides a force which urges the head of screw 13 away from the mounting portion 11 towards the monitor 2. This in turn urges the friction pads 15A,15B to squeeze against the respective surfaces of mounting portion 11, thus firmly attaching the camera 1 to the bracket 3.

The camera 1 can be repositioned by the following process. First the camera 1 is lifted against the force provided by spring 14 so as to remove the force applied by upper pad 15A on mounting portion 11. The camera can then be tilted by moving it along the curved surface of mounting portion 11, or rotated by a desired angle. Once the desired position the camera 1 is lowered whereby the friction pads 15A,15B are again urged against the surfaces of mounting portion 11 thus holding the camera rigidly in position.

Figure 3:
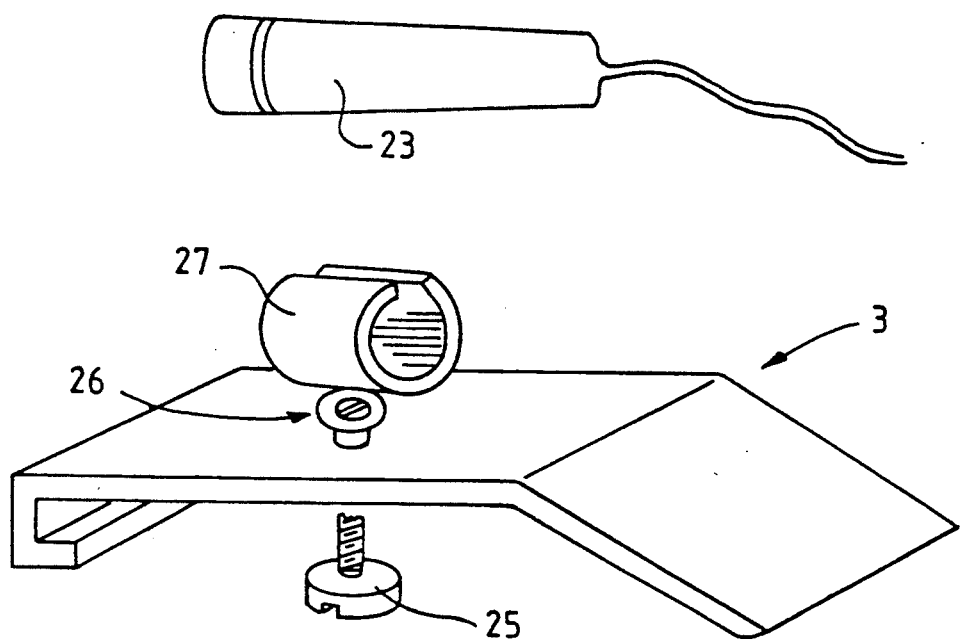
FIG. 3 shows an alternative design of the mounting bracket and connection means suitable for mounting a microphone or pencil camera.

Referring now to FIG. 3, an alternative design of the mounting bracket 3 is shown. This construction is used to mount a microphone, or alternatively a "pencil" camera, onto a computer monitor 2. A standard microphone clip holder 27 is attached via an adjusting screw 25 to the bracket 3. The microphone (or pencil camera) 23 is held in the holder 27 in the usual way and can be rotated perpendicular to the axis of screw 25 by turning the screw 25 through the desired angle.

A screw 26 is attached to the holder 27 at right angles to screw 25. To change the angle of tilt of holder 27 screw 26 is loosened, thus allowing the holder 27 to be moved to a new tilt angle. Once the desired tilt angle has been effected screw 26 is tightened to prevent any further change in the tilt angle.

Figure 4:
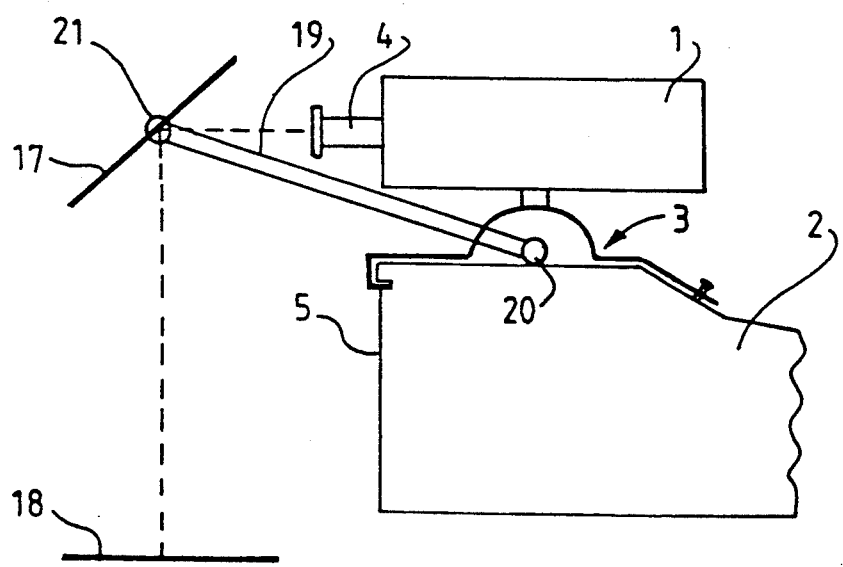
FIG. 4 shows a side elevation of the preferred embodiment incorporating an adjustably mounted mirror.
Figure 5:
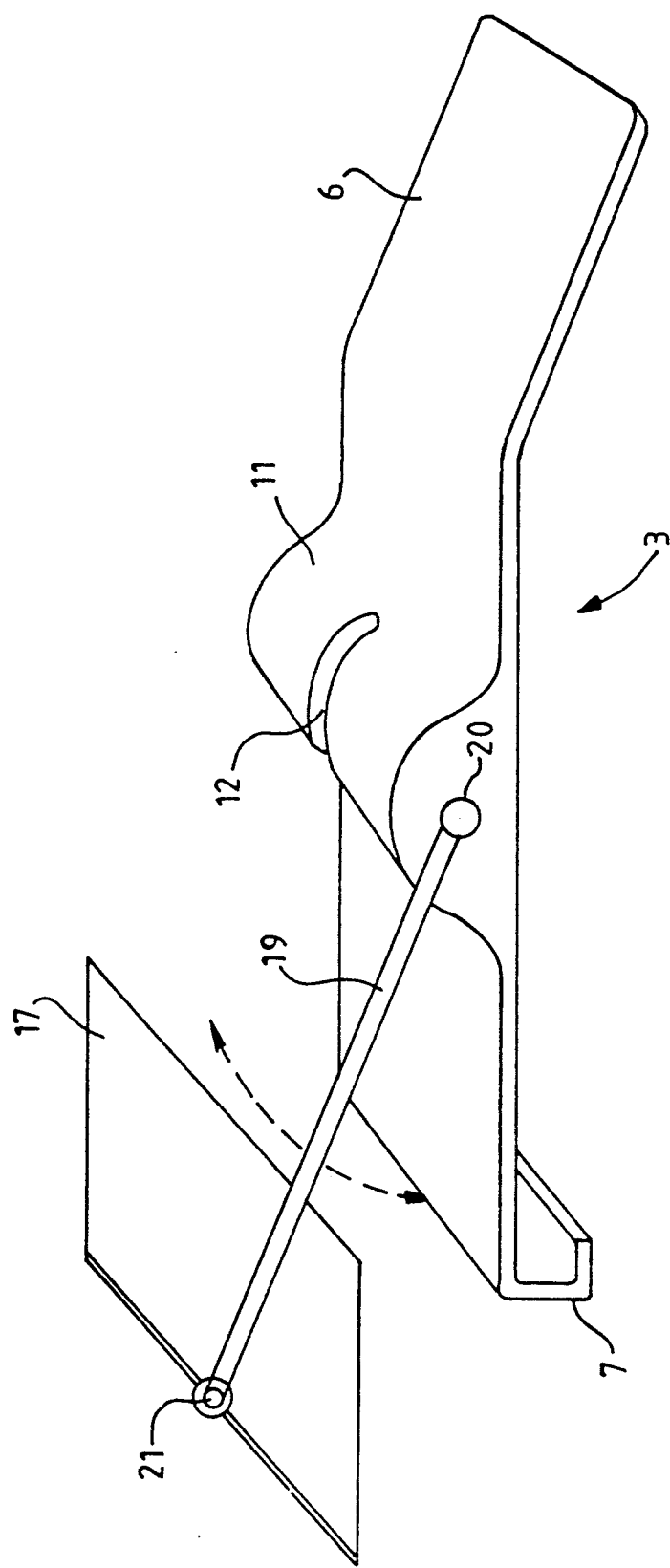
FIG. 5 is a perspective view of the mounting bracket of the preferred embodiment incorporating the adjustable mirror.

FIG. 4 shows a side elevation of the apparatus of the preferred embodiment which additionally incorporates a mirror 17. This mirror can be attached by arm 19 directly onto the monitor 2, or in preferred embodiments is attached by arm 19 to the mounting bracket 3 as shown in FIG. 5. The purpose of mirror 17 is to enable the camera 1 to form an image of a document 18 placed on a desk in front of the monitor. This image can then be transmitted to other computer terminals where it can be either displayed, printed, stored, etc. In this way information held by one person may readily be shared with companions in other locations that are linked by computer.

In the preferred embodiment shown in FIG. 5 one end of an arm 19 is pivotably attached to bracket 3 at pivot axis 20 in the mounting portion 11. The arm may be secured in a desired position by suitable means such as a wing nut (not shown). The other end of the arm 19 is attached to the mirror 17 along pivot axis 21. Hence the mirror 17 is movable relative to the arm 19, and the arm 19 is movable relative to the bracket 3. This arrangement allows the mirror to be moved very flexibly so that the document 18 can be accurately viewed by camera 1.

I claim:

1. A Mounting Bracket for attaching an accessory onto a display device that allows the accessory to be readily attached to or removed from said display device, comprising:
   - a hooking portion shaped to cooperate with a front surface of said display device so as to locate a first portion of said bracket on said display device;
   - a mounting portion adapted to receive said accessory; and
   - a stabilising portion providing a second point of location of a second portion of said bracket on said display device so as to provide stability between said bracket and said display device.

2. A Mounting Bracket as claimed in claim 1, wherein said mounting portion is attached to said accessory via connection means, said accessory being rigidly connected to said connection means and said mounting portion being adapted so as to allow said connection means to be tilted or rotated within predetermined limits.

3. A Mounting Bracket as claimed in claim 1, wherein said stabilising portion includes a fastening device whereby said stabilising portion is physically attached to said display device.

4. A Mounting bracket as claimed in claim 3, wherein said fastening device is a clip shaped such that no adaptation to the display device is required.

5. A Mounting Bracket as claimed in claim 1 wherein said display device is a computer monitor with a rim provided in a bezel of said monitor, said hooking portion hooking around said rim.

6. A Mounting Bracket as claimed in claim 1 wherein said accessory is a video camera, said mounting bracket providing a means for securely mounting said video camera on said display device in proximity to a display screen of said display device.

7. In combination an accessory with a mounting bracket as claimed in claim 1.

8. A Mounting Bracket as claimed in claim 2, wherein said stabilising portion includes a fastening device whereby said stabilising portion is physically attached to said display device.

9. A Mounting Bracket as claimed in claim 8, wherein said fastening device is a clip shaped such that no adaptation to the display device is required.

10. A display and accessory apparatus comprising:
a display device;
a mounting bracket for attaching an accessory onto a display device that allows the accessory to be readily attached to or removed from said display device, comprising:
a hooking portion shaped to cooperate with a front surface of said display device so as to locate a first portion of said bracket on said display device;
a mounting portion adapted to receive said accessory; and
a stabilising portion providing a second point of location of a second portion of said bracket on said display device so as to provide stability between said bracket and said display device, and
an accessory secured to said display device with said mounting bracket.

11. The apparatus of claim 10 wherein said accessory is one of a microphone and a video camera.

12. The apparatus of claim 10 wherein said display device is a computer monitor with a rim provided in a bezel of said monitor, said hooking portion hooking around said rim.

13. A mounting bracket as claimed in claim 10, wherein said mounting portion is attached to said accessory via connection means, said accessory being rigidly connected to said connection means and said mounting portion being adapted so as to allow said connection means to be tilted or rotated within predetermined limits.

14. A mounting bracket as claimed in claim 10, wherein said stabilising portion includes a fastening device whereby said stabilising portion is physically attached to said display device.

15. A mounting bracket as claimed in claim 14, wherein said fastening device is a clip shaped such that no adaption to the display device is required.

16. A mounting bracket as claimed in claim 10, wherein said display device is a computer monitor with a rim provided in a bezel of said monitor, said hooking portion hooking around said rim.

* * * * *